ered in the clips, on the rearward side of the axle, are bars 6 having offset serrated outer ends 7 adapted to engage the serrated surfaces 5. The inner cam ends of the bars are bevelled end 10 of one of the bars 6 being parallel to the corresponding end of the other bar. A central bar cam 11 having similar angular ends is pivotally mounted at 13 to the axle 8 between the bars 6, and is attached to each of the bars 6 by means of pivotally attached links 12. A relatively long bar 14 is pivotally attached at 15 to the bar cam 11, to one side of the pivot 13 and extends rearward in the driver's compartment into the frame 17 where it is pivoted to a projection 21 of a vertical spindle 20. Said projection extends from the lower end of the spindle, and a hand lever or crank 18 is rigidly attached to the upper end of the spindle, on the outside of the frame 17. A ratchet wheel 19 is fixed to the spindle, engaging on opposite sides, are pivotally mounted pawls 23 and 24 having tongues 25 and 26, respectively. A lever having arms 28 and 29, the former lying adjacent to the tongue 25 and the latter to the tongue 26, is rigid upon a shaft 27 which is rotatably mounted in the frame, and extends upward, terminating in a handle adapted to be rotated by the operator. Springs $15^a$ normally urge the bars 6 inward from the wheels 2, the springs being attached to eyelets 16 extending from the clips 9.# UNITED STATES PATENT OFFICE.

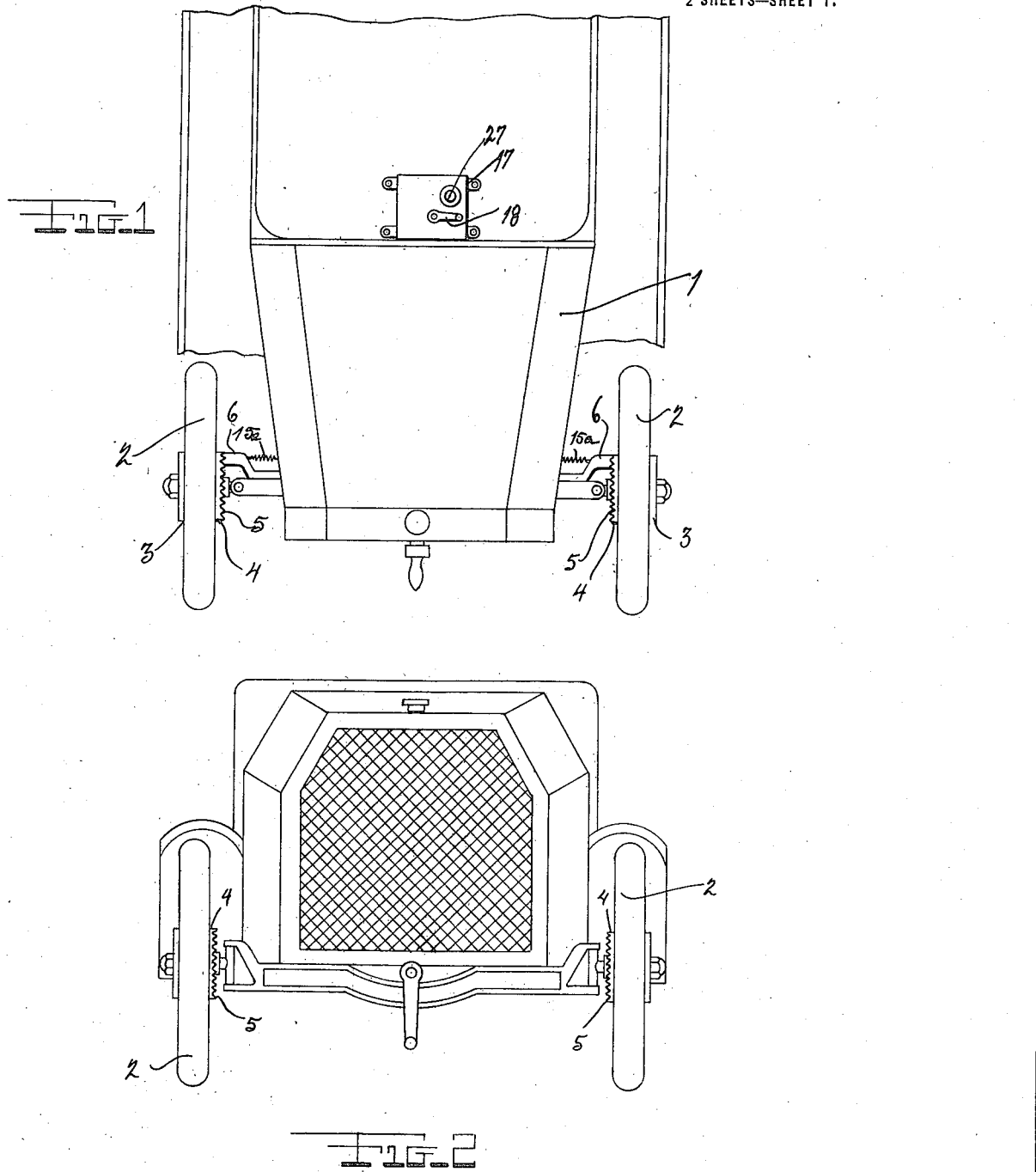

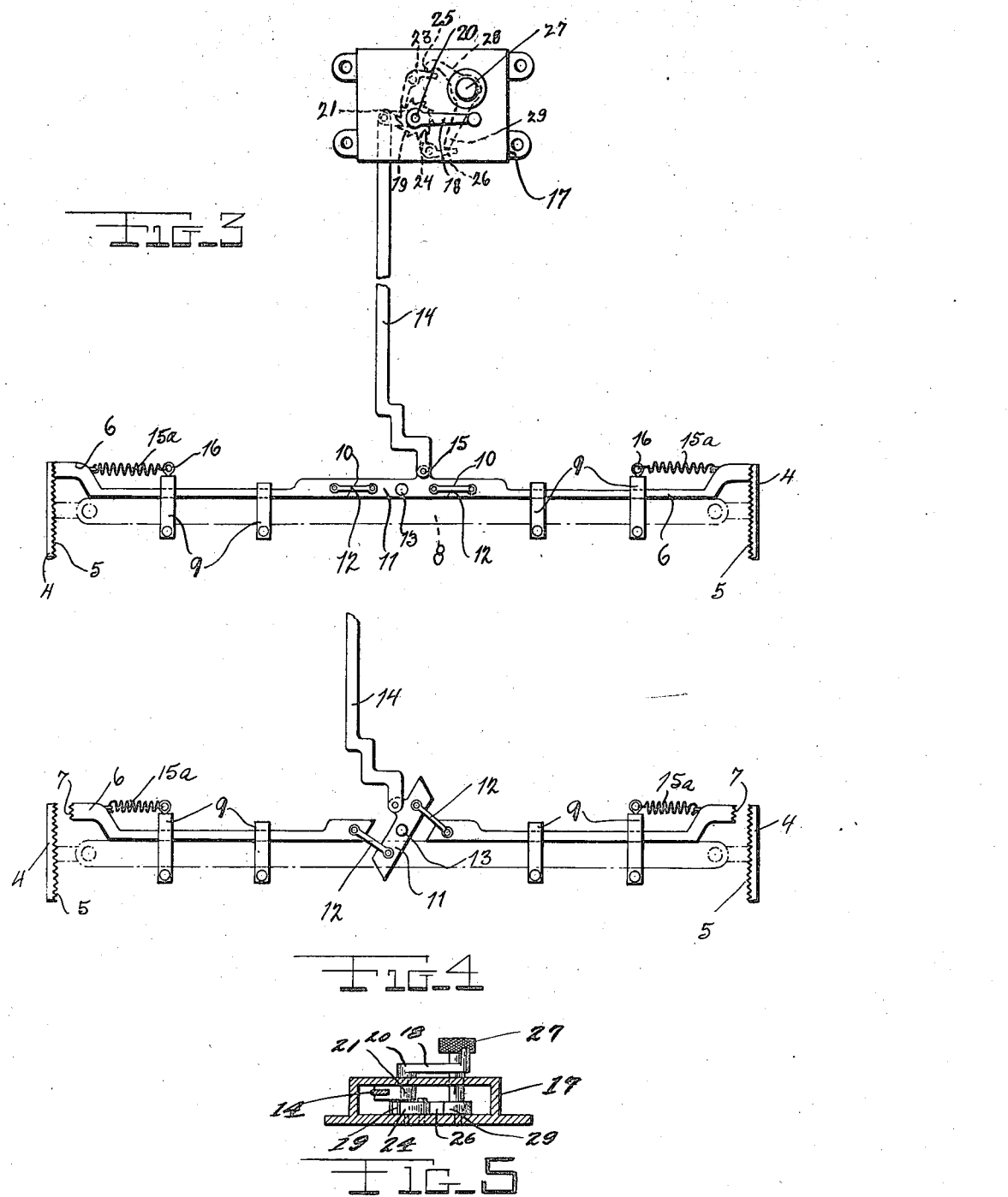

WOJCIECH FIAL, OF HARVEY, WEST VIRGINIA.

SAFETY DEVICE FOR AUTOMOBILES.

1,424,633.             Specification of Letters Patent.      Patented Aug. 1, 1922.

Application filed October 2, 1920. Serial No. 414,328.

*To all whom it may concern:*

Be it known that I, WOJCIECH FIAL, a citizen of Poland, residing at Harvey, in the county of Fayette and State of West Virginia, have invented certain new and useful Improvements in Safety Devices for Automobiles, of which the following is a specification.

The main object of this invention is the provision of a safety appliance for automobiles which will effectively prevent their movement from a state of rest by one not familiar with the appliance.

The above and other objects will become apparent in the description below, in which like characters of reference refer to like-named parts in the drawings.

Referring briefly to the drawings, Fig. 1 is a fragmentary plan view of an automobile equipped with my device.

Fig. 2 is a front elevational view of the same.

Fig. 3 is a plan view of my device, in locked position.

Fig. 4 is a fragmentary plan view of the same in open position. Figure 5 is a front elevational view of the frame, with the front wall removed.

Referring in detail to the drawings, the numeral 1 represents an automobile having wheels 2, provided with the usual hubs 3, the inner collars 4 of which are provided with serrated surfaces 5.

Clips 9 are rigidly attached in spaced relation to the front axle 8, and slidably mounted in the clips, on the rearward side of the axle, are bars 6 having offset serrated outer ends 7 adapted to engage the serrated surfaces 5. The inner cam ends of the bars are bevelled end 10 of one of the bars 6 being parallel to the corresponding end of the other bar. A central bar cam 11 having similar angular ends is pivotally mounted at 13 to the axle 8 between the bars 6, and is attached to each of the bars 6 by means of pivotally attached links 12. A relatively long bar 14 is pivotally attached at 15 to the bar cam 11, to one side of the pivot 13 and extends rearward in the driver's compartment into the frame 17 where it is pivoted to a projection 21 of a vertical spindle 20. Said projection extends from the lower end of the spindle, and a hand lever or crank 18 is rigidly attached to the upper end of the spindle, on the outside of the frame 17. A ratchet wheel 19 is fixed to the spindle, engaging on opposite sides, are pivotally mounted pawls 23 and 24 having tongues 25 and 26, respectively. A lever having arms 28 and 29, the former lying adjacent to the tongue 25 and the latter to the tongue 26, is rigid upon a shaft 27 which is rotatably mounted in the frame, and extends upward, terminating in a handle adapted to be rotated by the operator. Springs $15^a$ normally urge the bars 6 inward from the wheels 2, the springs being attached to eyelets 16 extending from the clips 9.

In operation, assuming the respective parts to be in the positions shown in Fig. 3, in order to release the engagement between the serrated ends 7 and the serrated surfaces 5 of the wheel hubs, the handle 18 is turned in a clock-wise direction, causing the bar 11 to turn upon the pivot 13 in a clock-wise direction, thereby withdrawing the rods 6 from the wheel hubs. In order to lock the wheels, the handle 27 is rotated a slight distance in a clockwise direction, thereby contacting the arms 28 and 29 with the tongues 25 and 26, respectively, and disengaging the pawls 23 and 24 from the ratchet wheel 19, permitting the handle 18 to be turned in a counter clock-wise direction, thus again locking the wheels.

I claim:

A lock for vehicles, comprising in combination with the axle and wheels thereof, of a toothed collar fixed to the inner ends of each of the wheel hubs, a pair of alined bars mounted to slide in opposite directions on the upper surface of said axle, toothed elements formed on the outer ends of said bars engageable with said collars, said bars having bevelled inner ends, a bar cam pivoted on said axle having its faces adapted for engagement with the said bevelled ends, links connecting said cam with each of said bars whereby they may be retracted, a rod operatively engaged with said cam, a hand lever for actuating said rod, means normally preventing movement of said lever, said means including a toothed ratchet wheel and a pair of pawls engaging opposite side thereof and means for retracting both of said pawls simultaneously.

In testimony whereof I affix my signature.

WOJCIECH FIAL.